United States Patent Office 3,568,378
Patented Mar. 9, 1971

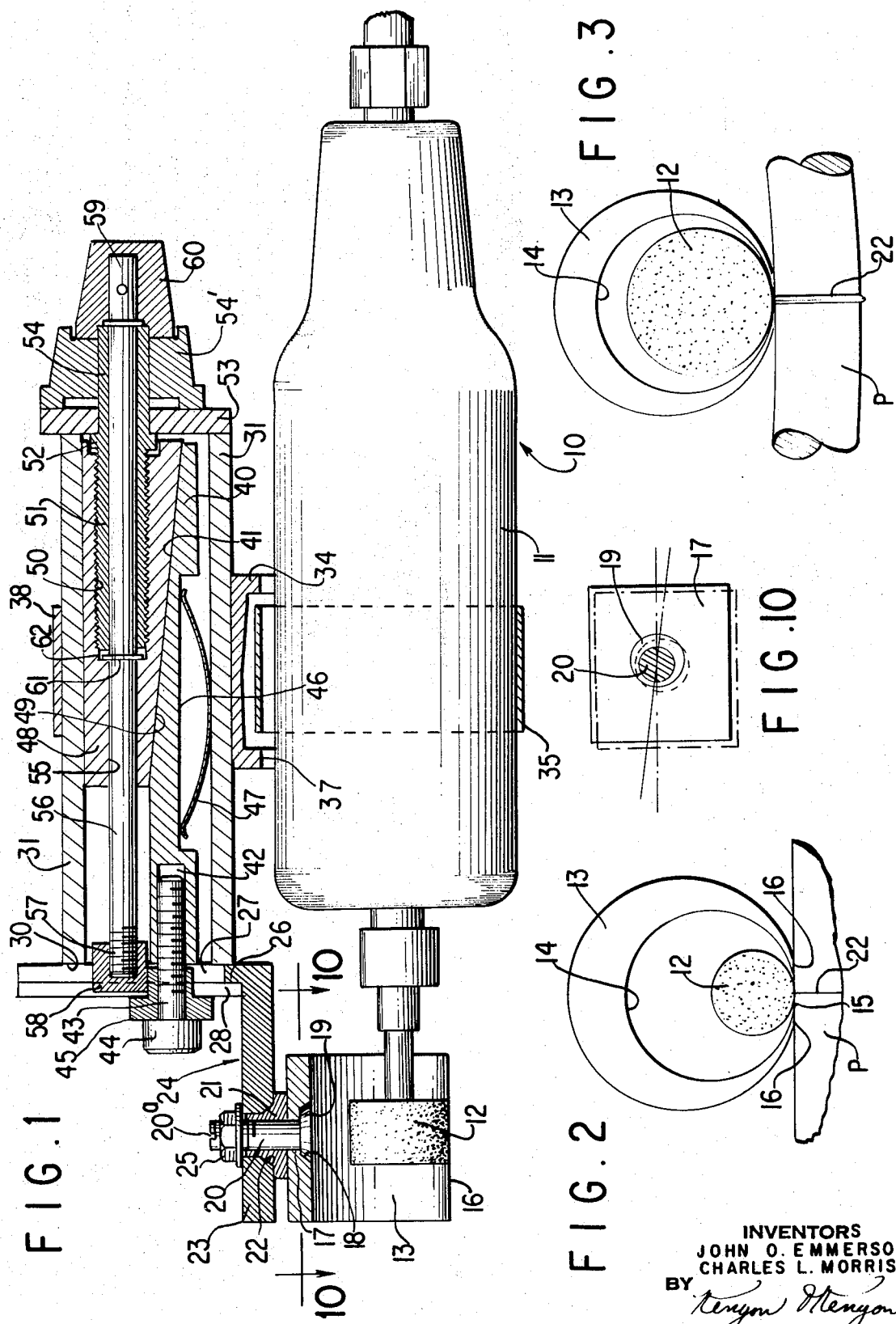

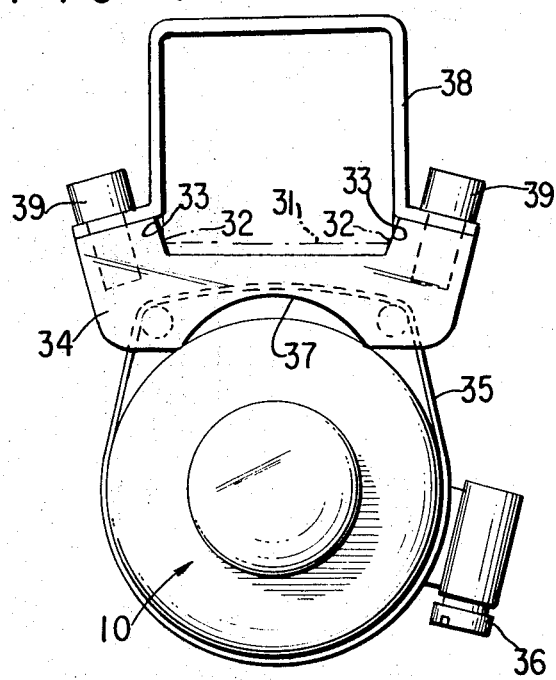
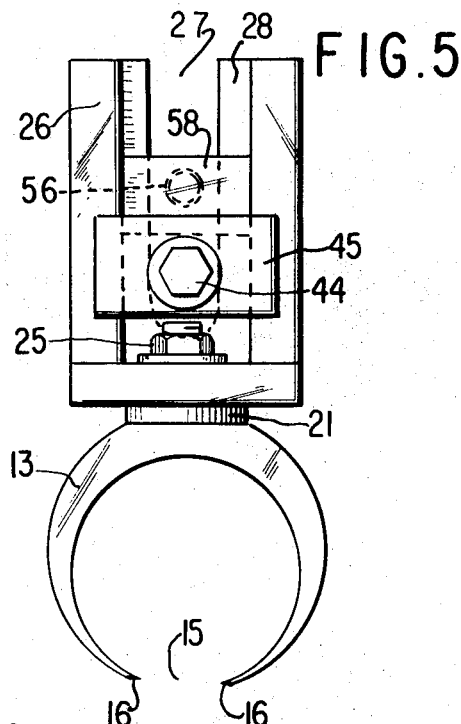
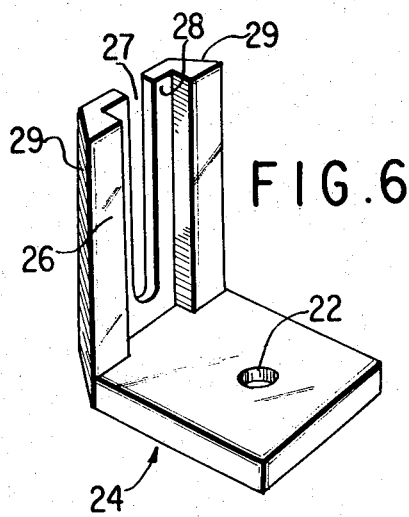
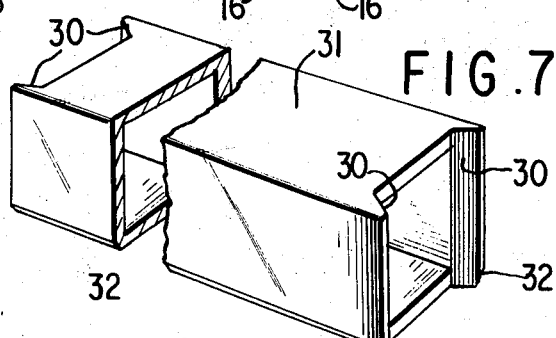
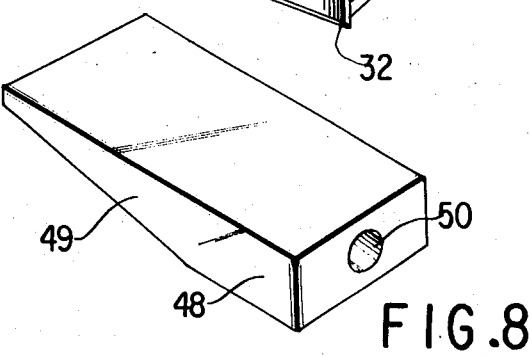
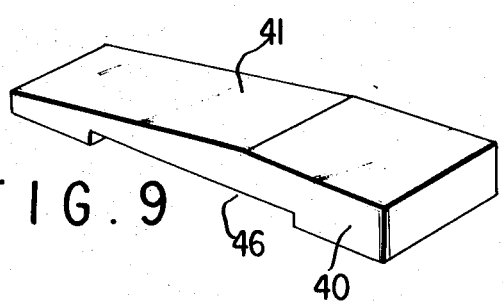

3,568,378
ADJUSTABLE PRECISION GUARD FOR POWERED HAND TOOLS, SUCH AS GRINDERS, BUFFERS OR THE LIKE
John O. Emmerson, Hamden, and Charles L. Morris, West Hartford, Conn., assignors to The DSD Company, Hamden, Conn.
Filed July 19, 1968, Ser. No. 746,096
Int. Cl. B24b 55/04
U.S. Cl. 51—268          10 Claims

ABSTRACT OF THE DISCLOSURE

Adjustable precision guard for powered hand tools such as grinders, buffers and the like to smooth out rough surfaces or reduce raised areas while preventing contact between the grinder or buffer wheel and surfaces adjacent the work area which is of particular importance where dimensional precision is required of the final product, including a longitudinally slotted guard surrounding the grinding or buffing wheel and adjustably attached to a bracket, the bracket being supported on a tubular body mounted on the tool to permit coarse adjustment of its vertical relationship with respect to the periphery of the wheel to regulate crudely the extent of outward projection of the wheel's surface relative to the guard and being micrometrically adjustable on the tubular body for micrometric adjustment of said outward projection. The guard is also rotatively adjustable by a camming arrangement to insure proper alignment of its slot and the axis of the wheel. The micrometric adjustment means is located within the tubular body. It includes wedge members, one of which is movable guidedly in axial direction of the tool shaft in reciprocal directions relative to the other as required by means of a manipulating screw to raise or lower the bracket and thus the guard with fine adjustment control relative to the wheel. Micrometric adjustments of the position of the guard slot relative to the wheel is provided by the combination of the thread pitch of the manipulating screw and the pitch of the engaging surfaces of the wedges so that the positional relationship between the guard and wheel may be controlled up to 0.0001". Locking means for the wedges and bracket and guard in any position of adjustment is provided.

BRIEF SUMMARY OF THE INVENTION

This invention relates to an adjustable precision guard applicable to powered hand tools such as rotary grinders or buffers for precisely limiting the extent of tooling action, e.g., grinding or buffing, on a work piece when the tool is applied to the latter.

Powered hand tools such as grinders or buffers are used extensively to smooth out rough surfaces or to reduce raised areas on a work piece, or to avoid expensive fixturing when finishing irregular shapes or when working on large or bulky objects. However, in applying the grinder or buffer wheel to the work piece being treated, when the wheel strikes a raised area, the tool is prone to jump and the wheel thus may come into contact with and grind or buff areas of the work piece other than the work area actually intended to be treated. This is particularly unacceptable where dimensional precision of the work piece is required.

For example, in the manufacture of metallic O-ring seals, these are made from flat aluminum strip stock or tubes which are bent into an O-shape and have their ends butt welded together. The weld area resulting at the joint is approximately 0.030" high and 0.030" wide and extends around the periphery of the butt welded joint. This projecting weld area must be ground down with precision to make the weld surface conform substantially to the same dimensions as the remainder of the O-ring surfaces with a desired maximum tolerance of no more than 0.0005".

The application of unguarded powered hand manipulated grinding or buffing tools or of other tools of this nature provided with roughly adjustable guards to work pieces fails to provide the required precision grinding or buffing and results in large quantities of rejects in the manufacturing process.

Principal objects and features of this invention are the provision of an adjustable guard means removably attachable to limit grinding, buffing, or other tooling action of the grinder, buffer or other tooling wheel to required precise tolerances in the work area of the work piece being treated and also to prevent any grinding, buffing or other tooling action in other regions of the work piece in the event of a jump or displacement of the wheel on its striking elevated areas when applied to the work piece.

Other objects and features of the invention are the provision of micrometric adjustment means for the guard that is rugged and will withstand shop abuse, and wear and tear during use without impairment of its micrometric adjustment features.

Another object and feature of the invention is to provide a very substantial surface (i.e. the faces of two related wedges) to react to pressures applied against the guard (versus the relative reduced surface of a micrometric thread which might otherwise accomplish this same purpose).

Further objects and features of the invention are the provision of a removable guard means applicable to different types of powered hand tools such as grinders or buffers wherein the axes of the guard means and of the grinder or buffer wheel are substantially parallel and wherein micrometric true relative adjustments of the axis of the guard means with respect to axis of the wheel may be effected.

Further objects and features of the invention are the provision of interchangeable guard means of different sizes to accommodate differently sized tooling wheels.

In practicing the invention, a tubular body is removably securable by an appropriate saddle and clamp to the housing of the tool device so as to extend in its axial direction and parallel with the axis of the tooling wheel. The guard means is supported as from a bracket at the end of the tubular body so as to surround the wheel, being roughly adjustable vertically and rotatively relative to the axis of said wheel whose periphery may be caused to extend outwardly of a gap or slot in the wall of the guard for tool dressing purposes and the guard then locked in this adjusted position. After dressing the position of the guard may be further micrometrically adjusted for actual tooling operations.

The tubular body is provided with a first wedge member having a sloping surface which is engageable with a complemental sloping surface of a second wedge member mounted in the body. The first wedge member is shiftable adjustably in its longitudinal direction. This adjustable shift of the latter wedge member is effected by a threaded screw rotatably threaded into the first wedge member and rotatably supported by the tubular body so that when the screw is turned, the resultant longitudinal shift of said first wedge and inter-engagement of its sloping surfaces with the complemental sloping surface of the second wedge causes a relative true vertical shift between the axes of the guard and wheel, thus regulating the position of the two with respect to each other. The combined action of the screw and slope of the wedge members produces a double vernier effect and thus provides micrometrical relative adjustment features for the guard with respect to the tooling wheel.

The number of threads per inch on the threaded screw and the slope of the wedges determine the extent of vertical shift of the guard for each complete or partial rotation of the screw and either can be varied in a particular embodiment as required to vary the amount of shift per turn of the screw to meet varying precision grinding, buffing or other tooling conditions.

In addition, means are provided to lock the wedge members, bracket and guard once any adjustment thereof has been effected.

Additional objects and features of the invention are to provide a guard attachment that is relatively simple in construction and easy to apply and use on different types of hand power tools.

Other objects and features of the invention will become apparent from the following detailed description and the accompanying drawings forming a part hereof and wherein:

FIG. 1 is a partially sectionalized elevational view of a powered hand tool such as a grinder or buffer to which an adjustable precision guard embodying the invention has been applied;

FIG. 2 is a side elevation of the relative positioning of the guard and wheel adjusted for preliminary grinding of a work area of a product;

FIG. 3 is a similar view showing application of the adjusted guard equipped grinding device to the work area of a product in the finishing step of the grinding operation;

FIG. 4 is a side elevational view seen from the right of FIG. 1;

FIG. 5 is a side elevational view seen from the left of FIG. 1;

FIG. 6 is a perspective view of the guard supporting bracket;

FIG. 7 is a perspective partially broken away view of the tubular body;

FIG. 8 is a perspective view of one of the wedge members;

FIG. 9 is a perspective view of the second wedge member, and

FIG. 10 is a sectional view taken along the plane of line 10—10 of FIG. 1.

DETAILED DESCRIPTION

Referring now to the drawings and first to FIG. 1 the reference character 10 denotes generally a powered hand tool device such as a grinder or buffer of air or electric type including a housing 11 of generally cylindrical shape from one end of which a replaceable conventional grinder, buffer or other tooling wheel 12 mounted on a shaft that extends axially from a chuck (not shown) is rotated by the internal operating mechanism (not shown) of the tool device 10 that rotates the chuck.

The guard member 13 has a cylindrical opening 14, a longitudinal slot 15 and defining lips 16 for said slot and is provided with a vertical opening 17 having an enlarged eccentrically located tapered seat 18 which latter receives the eccentric tapered head 19 of a vertical upstanding bolt 20 on which upwardly and externally of the guard member 13 a split bushing 21 is mounted. This split bushing 21 and the bolt 20 are mounted in an opening 22 in the horizontally extending arm 23 of a bracket member 24. The upper end of bolt 20 has a screw driver slot 20a to effect its rotation so that its eccentric head 19 upon corresponding rotation will effect rotary adjustment of the guard member 13 to permit aligning of its slot 15 with the axis of grinding wheel 12. Upon completion of such adjustment the lock nut 25 is tightened on bolt 20.

The vertical upstanding arm 26 of bracket 24 is slotted vertically at 27 and has a wider vertical recess 28 adjacent the narrower slot 27. The outer vertical edges 29 of arm 26 are tapered to fit in a complementary tapered end 30 of a tubular body 31 preferably of extruded metal such as aluminum and preferably of rectangular inner crosssection, said arm 26 being supported and vertically adjustable in said tapered end 30 of said tubular body 31. The lower longitudinal corner edges of the tubular body 31 are bevelled at 32 to enable snug fitting of said body in a complementary recess 33 of a saddle 34. This recess 33 serves to receive the lower surface and bevelled edges 32 of said body 31. The saddle 34 itself is mountable around the outer casing of the tool 11, being secured in place by conventional means such as a hose clamp 35 with usual tightening bolt 36. The under face 37 of saddle 34 is shaped to allow its mounting on differently shaped housings 11 of tools 10. Likewise, the tubular body 31 is secured to the saddle 34 as by a clamping bracket 38 that may be tightened around the body 31 and fastened to the saddle 34 as by set screws 39. The tubular body 31 is, of course, positioned on saddle 34 to extend parallel with its longitudinal axis and adjustable longitudinally to required position relative to the grinding tool 12 prior to tightening of bracket 38 by the set screws 39.

The micrometric vertical adjustment of the lips 16 of the slot 15 of guard member 13 relative to the grinding tool 12 is effected by adjustment means contained within the tubular body 31. This adjustment means includes a first wedge member 40 extending longitudinally within the tubular body 31 and having a tapered upper surface portion 41. This member 40 also has a tapped hole 42 in its forward end facing the vertical arm 26 of the bracket 24 into which a tightening screw 43 with preferably an Allen head 44 may be screwed through a clamping bushing 45 to tighten the bracket arm 26 and member 40 together. The under face of member 40 has a recess 46 which receives a biasing leaf-type spring 47 resting on the inner bottom face of tubular body 31. This spring 47 tends to bias member 40 upwardly internally of body 31 for purposes presently to be described.

A longitudinally movable second wedge member 48 having a tapered wedge surface 49 complemental with tapered surface portion 41 and riding on the latter is positioned internally of body 31. This second wedge member 48 has a longitudinally threaded bore 50 into which a hollow adjustment screw 51 may be screwed. This adjustment screw 51 is provided with an annular abutment 52 which rests against an end plate 53 at the rear end of tubular body 31 and extends outwardly at 54 through said end plate 53 for attachment thereto of a knurled adjustment knob 54'. Adjustment screw 51 being hollow, it with an unthreaded axial extension 55 of bore 50 permits insertion therein of a guide and locking member 56 which has a threaded end 57 that may be screwed into a locking nut 58 which is guidedly mounted in the recess 28 of the vertical bracket arm 26. The other end 59 of member 56 projects outwardly beyond knurled knob 54' and has a tightening knob 60 secured thereto. A retaining ring 61 is mounted on member 56 and is slidable axially in a recess 62 between the threaded portion 50 and unthreaded bore portion 51 in member 40.

In operation, the saddle member 34 is mounted around the housing 11 of the tool 10 in selected position and tubular body 31 is shifted to desired longitudinal position so that the grinding head 12 lies within its cylindrical opening 14 and clamping member 38 tightened around said body 31 by bolts 39. Then tightening screw 43 is loosened and tightening member 56 also loosened on lock nut 58 sufficiently to permit vertical motion of bracket arm 26 relative to the end of tubular body 31. The bracket arm 26 (screw 43 and member 56 being loose), of bracket 24 is then shifted vertically to adjust the vertical position of the guard 13 crudely to the approximately required relative position of the periphery of grinding wheel 12 and the slot or gap 15. Then the screw 24 is tightened to cause bracket arm 26 to be rigidly clamped to wedge member 40. The tightening member 55 during this crude adjustment remains loose so that the wedge member 40 may be shifted vertically in tubular part 31. Then lock nut 25 is loosened and guard member 13 rotated about bolt 20 sufficiently to bring its slot or gap 15 and defining lips 16 into axial parallellism with the axis of tool head 12 and also shifted laterally to center the lips 16 relative to the projecting surface of the grinding tool 12. Then lock nut 25 is tightened.

Now the serrated knob 54' is rotated in proper direction to effect a longitudinal shift fore or aft of movable wedge member 48 to force required fall or rise of wedge 40 against the biasing resistance of spring 47 to effect micrometric vertical shift and exactly desired positioning of the gap or aperture 15 relative to the periphery of the grinding wheel 12. As soon as this micrometric vertical adjustment is effected, the locking knob 60 is rotated to tighten locking member 56 in locking nut 58 and cause bracket arm 26 to be pulled back into firm engagement with the end of tubular body 31. The bevelled or tapered edges 29 of the bracket arm 26 fit tightly into the matching biased edges 30 of tubular body 31 causing complete rigidity of the bracket 24 and tubular body and firm fixed micrometrically adjusted position of guard 13 relative to grinding wheel 12.

With the arrangement described, it is possible to achieve true possible positioning of the guard 13 relative to the wheel 12, thus maintaining its parallelism with the wheel at all times. The guard 13 may be provided in different sizes with differently sized openings 14 and slots 15 to accommodate differently shaped or sized tool devices simply by using differently shaped or sized saddles. In addition, and of importance, micrometric adjustment is effected by the screw-threaded operation of the member wedge 48.

Such micrometric adjustment might be effected by the use of conventional micrometer thread to raise or lower the guard relative to any mounting structure on the tools. It is well known, however, that micrometers are "instruments" rather than "tools." The are delicate and not designed to stand up well under rough or "shop" treatment. With the arrangement of this invention, however, conventional heavy duty shop-type hardware can be employed without sacrifice of the desired and required micrometric adjustment features. Thus, the screw 51, for example may employ thirty-two threads to the inch and operates a wedge 48 having a 5° slope, so that as a result the guard member is caused to shift vertically approximately 0.003" per turn of the screw 51. The number of threads per inch as well as wedge slope can be altered to achieve different extents of shift and no limitation to these exact dimensional features is intended.

In any event, the screw threads are not delicate and will withstand typical shop abuse and even could become grossly worn or damaged without interfering with the intended micrometric adjustment capabilities of the device.

With the arrangement described, coarse vertical adjustment of the guard 13 relative to the wheel 12 is first effected by loosening set screw 44 and shifting guard 13 relative to said wheel 12 to an approximately desired position and then retightening the set screw 44. Thereafter (with screw 56 loose) the adjustment screw 51 is manipulated to shift wedge 48 longitudinally in desired direction to effect micrometric adjustment of the relative position of the guard 13 relative to wheel 12. The combination of the pitch of the thread of adjustment screw 51 and the pitch of the mating wedge surfaces permits micrometer-like relative adjustment of guard 13 with respect to the wheel 12 of the order of 0.0001" and variation in the pitch of the said thread or wedge surface can be utilized to provide other desired like close micrometric adjustments. In effect, the wedge driven by the screw thread constitutes a "double vernier" in which the wedge is employed to effect true vertical movement of the guard.

In operation, the guard member 13 is positioned so that its opening 14 surrounds the wheel 12 and saddle 34 tightened on the housing 11 of tool 10 and clamping bracket 38 tightened around body 31. The set screw 44 is loosened and the guard member 13 is visually adjusted vertically crudely so that the periphery of the wheel 12 extends slightly outside of the gap or slot 15 and the set screw 42 is then retightened. The tool 10 is then turned on and the wheel 12 is applied to a dressing surface until no further material is removed from the wheel's periphery by said dressing surface. The tool is then turned off. The clamping screw 56 is then loosened and the threaded adjusting screw 51 turned to slide the wedge 48 to lower the guard vertically relative to the desired periphery of wheel 12 sufficiently so that the periphery of the wheel lies inside of the plane surfaces thereof by a desired micrometric amount, for example, 0.005". The clamping screw 56 is then retightened and the tool device again turned on and the driven guarded wheel 12 applied to the work area of the workpiece P over the projecting weld W as seen in FIG. 2 in a preliminary grinding step. The wheel 12 grinds away the projecting weld to the limit permitted by engagement of the plane lips 16 of guard 13, with the surface of the work piece P adjacent the projecting weld. In such procedure, if the wheel 12 should jump or jerk, since its lower periphery then lies inside said plane surfaces of lips 16, no grinding or other harm can be effected on the work piece P. Upon completion of this preliminary grinding step, the ground weld surface still projects from the main work piece surface by the amount that the lower periphery of the grinding wheel 12 lies inside the plane surfaces of lips 16 of the guard 13, for example, 0.005".

The clamping screw 56 is then again loosened and screw 51 re-manipulated to move the wedge 48 so as to bring the plane faces 16 of the guard member to the same level as the lower periphery of the wheel 12 and clamping screw 56 then retightened in this re-adjusted position of the guard member. The driven wheel 12 is then reapplied to the remaining unground projecting portion of the weld in a finishing grinding step to grind it way as is seen in FIG. 3. Upon engagement of the plane surfaces of lips 16 of the guard 13 with the outer surface of the work piece P adjacent the weld, the wheel 12 is prevented from further grinding away of the weld surface which then lies substantially flush with the adjoining surfaces of the work piece within a tolerance of approximately 0.0005" which, in general, meets all precision requirements.

The slope of the wedge surfaces and the pitch of the threaded adjustment screw 51 are proportioned, for example, so that ⅛ of a turn of screw 51 shifts the wedge 48 sufficiently to produce a 0.00025 inch vertical shift of the guard relative to the wheel. This ratio, can, of course, be changed to provide any desired extent of relative shift.

Although specific embodiments of the invention have been described and shown, variations within the scope of the appended claims are possible and are contemplated. There is no intention, therefore, of limitation to the exact abstract or disclosures herein presented.

What is claimed is:
1. A precision guard for a powered hand tool device having a rotary driven tool which extends from a tool housing comprising a tubular body, means for removably securing the body to said housing in parallelism with the longitudinal axis of said tool, a bracket member mountable on an end of said tubular body, a guard member secured to said bracket member and having an opening surrounding said tool, said bracket member being shiftable vertically relative to said tubular body, said opening having a gap through which the periphery of said driven tool may extend outwardly and vice versa, a vertically shiftable wedge member within said tubular body having an inclined surface, a second longitudinally movable wedge member having a complementary surface movable over said inclined surface of said first-named wedge member and engaging it, threaded adjustment means for moving said second-named member, and locking means for securing said last-named wedge member in any adjusted position as effected by said threaded adjustment means, the rotation of said threaded adjustment means and corresponding axial movement of said second wedge member acting to effect vertical shift of said first-named wedge member and substantially vertical micrometrically adjustable shift of the bracket and said guard member relative to said tool.

2. A precision guard for a powered hand tool device according to claim 1, wherein said gap is defined by lips with plane faces engageable with a surface portion of a work piece to limit tooling action of the driven tool upon the work piece.

3. A precision guard for a powered hand tool device according to claim 1, wherein said guard member is secured to an arm of said bracket and wherein said threaded adjustment means is rotatably threaded into said second wedge member.

4. A precision guard for a powered hand tool device according to claim 1, wherein said adjustment means for said second wedge member includes locking means for maintaining said second wedge member in any adjusted position and spring biasing means for said first-named wedge member.

5. A precision guard for a powered hand tool device according to claim 1, wherein said first-named means includes a saddle mountable on said device, and means for securing said saddle to said device.

6. A precision guard for a powered hand tool device according to claim 1, wherein said first-named means includes a saddle mountable on said device and clamp means for securing said tubular body to said saddle.

7. A precision guard for a powdered hand tool device according to claim 1, wherein said guard member has an opening with a tapered seat, a bolt having an eccentric head resting in said seat and extending into an arm of said bracket member, and means for locking and tightening said bolt in any adjusted position of said guard member relative to said arm.

8. A precision guard for a powered hand tool device according to claim 1, wherein said locking means includes a threaded locking member extending longitudinally through said second wedge member and a locking nut engaged by said locking member for tightening said wedge member in any vertically adjusted positions of said bracket member.

9. A precision guard for a powered hand tool device according to claim 1, including inter-engageable complementary tapered guide surfaces on said bracket member and said end of said tubular body to which said bracket member is mounted to effect rigid positioning of said bracket member in its adjusted vertical position on said body member.

10. A precision guard for a powered hand tool device according to claim 1, including means for adjusting said opening to parallelism with the axis of said tool and fixing it in such position.

References Cited
UNITED STATES PATENTS

| | | | |
|---|---|---|---|
| 2,894,418 | 7/1959 | Jackson | 51—268X |
| 967,054 | 8/1910 | Price | 51—268UX |
| 1,982,083 | 11/1934 | Strand | 144—251X |
| 2,649,873 | 8/1953 | Reich et al. | 145—4 |
| 1,679,562 | 8/1928 | Clarke | 154—4 |

JAMES L. JONES, JR., Primary Examiner